(12) United States Patent
Szegedy et al.

(10) Patent No.: US 11,676,104 B2
(45) Date of Patent: Jun. 13, 2023

(54) SYSTEMS AND METHODS FOR COORDINATING DECISIONS BETWEEN NON-COMMUNICATING PARTIES

(71) Applicant: ALIBABA GROUP HOLDING LIMITED, Grand Cayman (KY)

(72) Inventors: Mario Szegedy, San Mateo, CA (US); Dawei Ding, San Mateo, CA (US); Yaoyun Shi, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 940 days.

(21) Appl. No.: 16/443,701

(22) Filed: Jun. 17, 2019

(65) Prior Publication Data

US 2020/0394613 A1    Dec. 17, 2020

(51) Int. Cl.
| | |
|---|---|
| *G06Q 10/10* | (2023.01) |
| *G06N 10/00* | (2022.01) |
| *G06Q 10/063* | (2023.01) |
| *H04L 12/00* | (2006.01) |
| *G06Q 40/04* | (2012.01) |
| *H04L 9/00* | (2022.01) |
| *G06N 10/20* | (2022.01) |
| *G06N 7/01* | (2023.01) |

(52) U.S. Cl.
CPC ............ *G06Q 10/103* (2013.01); *G06N 7/01* (2023.01); *G06N 10/00* (2019.01); *G06N 10/20* (2022.01); *G06Q 10/063* (2013.01); *G06Q 40/04* (2013.01); *H04L 9/00* (2013.01); *H04L 12/00* (2013.01)

(58) Field of Classification Search
CPC .... G06Q 10/103; G06Q 10/063; G06Q 40/04; G06N 7/005; G06N 10/00; G06N 10/20; H04L 9/00; H04L 12/00
USPC .......................................................... 706/62
See application file for complete search history.

(56) References Cited

U.S. PATENT DOCUMENTS

| | | | |
|---|---|---|---|
| 9,311,670 B2 * | 4/2016 | Hoffberg ............ G06Q 20/0652 |
| 10,349,208 B1 * | 7/2019 | Liang ....................... G06F 16/29 |
| 2014/0324745 A1 * | 10/2014 | Leppanen ............ G06K 9/6254 |
| | | | 706/12 |

OTHER PUBLICATIONS

Broadbent et al.; "Can quantum mechanics help distributed computing?"; dated Nov. 30, 2009 (14 pgs.), https://arxiv.org/abs/0810.5317.

De Oliveira; "Embezzlement States are Universal for Non-Local Strategies"; Blavatnik School of Computer Science, Tel Viv University; dated Sep. 3, 2010 (7 pgs.), https://arxiv.org/abs/1009.0771.

(Continued)

*Primary Examiner* — James C Kerveros
(74) *Attorney, Agent, or Firm* — Finnegan, Henderson, Farabow, Garrett & Dunner, LLP

(57) ABSTRACT

Systems and methods are provided for coordinating decisions between noncommunicating parties using quantum physics. The procedure includes recognizing and identifying features of a coordinating decisions between non-communicating parties (CDNP) problem, expressing these features in a precise and mathematical manner, finding a solution using quantum states and measurements, and physically implementing the solution. Since quantum mechanics can violate Bell inequalities, quantum solutions to a CDNP problem have advantages over non-quantum solutions.

19 Claims, 8 Drawing Sheets

(56) References Cited

OTHER PUBLICATIONS

Ikuta et al; "Four-dimensional entanglement distribution over 100 km"; www.nature.com/scientificreports; NTT Basic Research Laboratories, NTT Corporation; dated Dec. 17, 2017 (7 pgs.).

Palazuelos; "Random Constructions in Bell Inequalities: A Survey"; Article in Foundations of Physics dated Feb. 7, 2015 (26 pgs.), https://www.researchgate.net/publication/272195557.

Yin et al.; "Satellite-based entanglement distribution over 1200 kilometers"; Science 356—Research Article—Quantum Optics pp. 1140-1144 dated Jun. 16, 2017 (6 pgs.), http://science.sciencemag.org.

Van Dam et al.; "Universal entanglement transformations without communication"; The American Physical Society—Physical Review A 67, 060302(R) (2003) (3 pgs.).

Brunner et al.; "Bell nonlocality"; American Physical Society—Reviews of Modern Physics, vol. 86, Apr.-Jun. 2014 (60 pgs.).

Hensen, et al.; "Loophole-free Bell inequality violation using electron spins separated by 1.3 kilometers"; Nature, vol. 526; Oct. 29, 2015 pp. 682-686 (5 pgs.).

\* cited by examiner $$\underbrace{\begin{pmatrix} \text{decisions}_1 & \cdots & \text{decisions}_{|\mathcal{D}|} \\ \text{utility}_{11} & \cdots & \text{utility}_{1|\mathcal{D}|} \\ \vdots & \ddots & \vdots \\ \text{utility}_{|\mathcal{O}|1} & \cdots & \text{utility}_{|\mathcal{O}||\mathcal{D}|} \end{pmatrix}}_{\substack{\text{observations}_1 \\ \vdots \\ \text{observations}_{|\mathcal{O}|}}} p_\mathcal{O}(o)$$

SYSTEMS AND METHODS FOR COORDINATING DECISIONS BETWEEN NON-COMMUNICATING PARTIES

BACKGROUND

In many industries, operations rely on collaborative decision making. Currently, two or more parties involved in decision making rely on the Internet to communicate information in near-real-time. However, there are cases in which communication services cannot be used. For instance, the services might be unavailable due to natural disaster, geographic location, technical glitches, or other circumstances. Furthermore, although communication can now be achieved near the speed of light, the fundamental limit in nature, there are often cases for which even this is insufficient. Examples include high frequency trading and online gaming, where latency is measured in the units of milliseconds. In a society where parties are often on different sides of the globe, milliseconds is the fundamental time limit for anything to travel from one party to another.

In the absence of communication, the parties typically resort to making decisions that only depend on each respective party's observations. One approach is for the parties to agree on a protocol beforehand involving shared randomness. For instance, they can generate a series of random numbers and share them with each other. However, such protocols are insufficient and yield suboptimal results that offer no benefit over the parties making independent decisions without coordination.

SUMMARY

In view of the above problems, embodiments of the present disclosure are proposed to provide a versatile approach to coordinating decisions between multiple parties not in communication with each other using the unique properties of quantum physics. More particularly, disclosed embodiments use quantum entanglement between the non-communicating parties to make individual decisions to achieve some joint objective.

In accordance with some embodiments of the present disclosure, there is provided a system for coordinating decisions between noncommunicating parties. The system includes a source, a first processor, and a memory communicatively coupled to the first processor, wherein the memory stores instructions. The first processor is configured by the instructions to determine a decision to be made, wherein the decision requires coordination between the first processor and a second processor and wherein the first processor is not communicatively connected to the second processor. The first processor is configured by the instructions to determine, based on a model, a protocol defining a set of resulting actions. The first processor is configured by the instructions to determine a choice of measurement based on one or more observations. The first processor is configured by the instructions to receive, by a detector, a measurement of a particle generated by the source, the measurement corresponding to the choice of measurement. The first processor is configured by the instructions to execute a resulting action from the set of resulting actions based on the measurement outcome.

In accordance with some embodiments of the present disclosure, there is provided a method for coordinating decisions between noncommunicating parties. The method includes determining a decision to be made, wherein the decision requires coordination between a first processor and a second processor. The method includes determining, based on a model, a protocol, the protocol defining a set of resulting actions. The method includes determining a choice of measurement based on one or more observations. The method includes receiving, by a detector, a measurement of a particle generated by a source, the measurement corresponding to the choice of measurement. The method includes executing a resulting action from the set of resulting actions based on the measurement outcome.

BRIEF DESCRIPTION OF THE DRAWINGS

Reference will now be made to the accompanying drawings showing example embodiments of the present application, and in which:

FIG. 3 illustrates a probability distribution over observations and a utility matrix of an exemplary CDNP, consistent with some embodiments of the present disclosure.

DETAILED DESCRIPTION OF EXEMPLARY EMBODIMENTS

Figure 1:
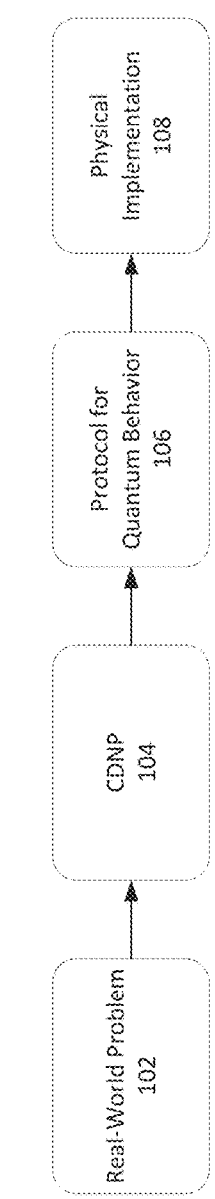
FIG. 1 illustrates an exemplary process for identifying and solving a coordinating decision between non-communicating parties (CDNP) problem, consistent with some embodiments of the present disclosure.

Reference will now be made in detail to the embodiments, examples of which are illustrated in the accompanying drawings. Whenever possible, consistent reference numbers will be used throughout the drawings to refer to the same or like parts.

A problem exists when two or more parties are not in communication and cannot share observations with each other, but are trying to coordinate decisions to achieve a joint objective in response to a set of observations that each respective party has made. For example, there may be two parties A and B who can each observe a single bit, x and y, respectively. Each party, A and B, may need to make decisions a and b, that are also bits, such that $x \wedge y = a \vee b$. The problem becomes how A and B can make their respective decisions without communicating their observations to each other. This problem will be referred to herein as coordinating decisions between noncommunicating parties ("CDNP").

Solving a CDNP problem is challenging because an effective coordinated decision requires every party involved to know the observations of the other parties. This problem is common even with developed communication services, as there are many cases in which these services cannot be used or are insufficient. For example, the services might be unavailable due to natural disaster, geographic location, technical glitches, or other circumstances. Furthermore, although communication can now be achieved near the speed of light, the fundamental limit in nature, there are often cases for which even this is insufficient. Examples include high frequency trading and online gaming, where latency is measured in milliseconds. In a society where parties are often on different sides of the globe, milliseconds is the fundamental time limit for anything to travel from one party to another.

Now, in each of the above scenarios, it is often desirable for the non-communicating parties to coordinate individual decisions in response to their respective observations. For example, in high frequency trading, traders (often computers) on different continents coordinate their financial decisions according to observations of their respective local markets. These decisions are often made with speeds that do not allow for one trader to wait for information to arrive from another.

In the absence of communication, the parties typically resort to independent decisions that only depend on their respective observations. Continuing with the trading example, the traders make independent financial decisions depending only on their local market data. More generally, the traders could agree on a protocol beforehand involving shared randomness. For example, before they start trading, the traders may generate a series of random numbers and share them with each other. When the traders start trading, they can make decisions according to their local observations and according to their copy of the shared randomness. However, these protocols are insufficient. Indeed, if one mathematically models CDNP in the way proposed below, shared randomness cannot do better than each party making an independent decision. This ignores the original problem altogether as no coordination whatsoever is involved.

Currently, no solutions address the CDNP problem. Possible approaches to similar problems are concerned with specific technical details of quantum communication systems or entanglement distribution. For example, some solutions are concerned with how entanglement can assist communication. Other solutions incorrectly state that entanglement can be used to achieve instantaneous communication. Still other solutions are highly theoretical and lack a practical application.

In some embodiments, systems and methods describe a possible mathematical formulation of CDNP based on the formulation of nonlocal games as they are known in physics and computer science literature. For example, a CDNP can be expressed as a probability distribution over all possible observations made by the parties and a utility matrix whose entries describe the utility associated with a particular set of observations and decisions. Decision-making parties need to coordinate decisions to obtain a high utility. As used herein, the term "decisions" may also be referred to as "behaviors." In disclosed embodiments, a CDNP may be solved using quantum protocols. For example, the parties share an entangled quantum state and perform quantum measurements on their respective quantum systems. The choice of measurements may depend on each party's respective observations. These measurement results then determine each party's respective decisions.

In some embodiments, the resulting quantum behaviors with respect to a CDNP can outperform an independent behavior. However, the problem is to identify these quantum behaviors. In some embodiments, proposed approaches take a CDNP as input and output a quantum protocol that optimizes the utility. In some embodiments, physical implementations of quantum protocols may include, for example, quantum-enabled satellites and nitrogen-vacancy centers.

The following detailed description of the proposed invention is meant to clarify the ideas of the disclosed systems and methods and not to limit their scope. Described solutions as well as specific protocols and physical implementations are only several of many possibilities and does not rule out the others. Unless otherwise defined, all terms (including technical and scientific terms) used herein have the same meaning as commonly understood by one with technical knowledge in the field of quantum information science. While certain non-limiting examples will be described below with reference to two parties, systems and methods described may be used to coordinate decision making between any number of parties.

FIG. 1 is a flowchart illustrating a CDNP problem, consistent with disclosed embodiments.

At step 102, the system may develop a CDNP scenario by recognizing features that are associated with a CDNP. As referred to herein, a CDNP may be defined as having the following characteristics: i) multiple parties are involved; ii) the parties are not in communication; iii) each party can make observations not available to the other parties; and iv) taking into account all observations made by the parties, the parties would like to coordinate decisions to achieve a joint objective.

As previously described, CDNP can arise in many scenarios. For example, a CDNP can arise when communication services are unavailable or when communication services are not fast enough. For example, when communication services are not available, the parties cannot communicate because the communication services of one or more of the parties are cut off by natural disasters or other extraordinary circumstances. In another example, the one or more parties may be in locations with no access to communication services. In another embodiment, communication services may be unavailable due to a technical failure on the side of the communication provider or due to some other technical fault.

An example of a scenario in which communication services may not be available is when multiple drones, or other smart devices or computers, are involved in a project conducted deep underground and are separated. The network of devices is required to complete a project successfully, yet each drone has a limited battery supply. This scenario satisfies the first condition of being a CDNP since there are multiple drones. The second condition is satisfied because their locations preclude the possibility of communication. The third condition is satisfied since each drone can only observe its own remaining battery supply. Finally, the fourth condition is satisfied because the drones are required to coordinate their actions to complete the project while taking into account the battery supply of every drone. Hence this scenario is a CDNP.

In another example, the decision-making parties cannot communicate because the available communications services are not fast enough. This scenario may arise in high frequency trading, where effort and money are spent to minimize the time required to complete a financial transaction. Pressure to communicate at fast speeds may be due to competition in which a difference of a few milliseconds or microseconds can make the difference between a profitable or unprofitable transaction.

Another exemplary scenario in which standard communications methods are not fast enough is that of online gaming. For example, players may have trained reaction speeds on the order of milliseconds. In fast-paced games, such as first-person shooters, the differences in time can distinguish a win from a loss, which may determine the outcomes of massive international tournaments.

Another example in which standard communication methods are insufficiently fast is that of high frequency trading. For example, a high frequency trading firm may own several computer clusters based in different trading exchanges around the globe. Specialized algorithms coordinate collective trading strategies to maximize income given local stock prices and other key information. However, in the presence of heated competition, these trading strategies must be implemented as quickly as possible. This scenario is a CDNP. There are multiple computer clusters and the decisions of these clusters have to be made as soon as possible, which often prevents one cluster from waiting for information to arrive from the other. Due to proximity, each computer cluster may only have near-immediate access to market information at its respective local exchange. The fine owning the computer clusters may wish to maximize profits resulting from the transactions. Maximizing profits may depend on, for example, the market information for all exchanges.

In some embodiments, the timescale involved may be milliseconds or less, while the time for light in a vacuum to travel from, for instance, New York to Hong Kong is about 40 milliseconds. Given the speed of financial transactions, it may take too long for information, which can travel, at most, at the speed of light, to go between New York and Hong Kong, making coordination via communication infeasible.

At step 104, the system mathematically formulates a CDNP problem to precisely define what the problem, e.g., the problem requiring a decision, is and what would constitute a solution. In some embodiments, the mathematical formulation may be based on that of nonlocal games, which are well known to one of ordinary skill in the art in physics for the study of Bell inequalities and nonlocality.

The following presentation is not meant to limit the scope of the invention to this specific definition as there can be variations. In particular, there may be mathematical results that strongly depend on the definition used. Letting $n>1$, n-party CDNP is a tuple $(\{O_i\}_{n=1}^n, \{D_i\}_{i=1}^n, p_\mathcal{O}(o), \mathcal{U})$ where $O_i$, $D_i$ are non-empty finite sets for all $i \in [n]$, $p_\mathcal{O}(o)$ is a probability distribution over $\mathcal{O} \equiv x_{i=1}^n O_i$, and $\mathcal{U} \in \mathbb{R}^{|\mathcal{O}| \times |\mathcal{D}|}$ where $\mathcal{D} \equiv x_{i=1}^n D_i$.

For any $i \in [n]$, let $d_i$ and $o_i$ denote elements in $\mathcal{D}_i$ and $\mathcal{O}_i$, respectively. Then, a behavior for this CDNP, referred to herein as Equation 1, may be given by a set of conditional probabilities $\{p(d|o)\}_{d \in \mathcal{D}, o \in \mathcal{O}}$ such that for all $i \in [n]$, $d_i, \ldots, d_{i-1}, d_{i+1}, \ldots, d_n, \ldots, o_1, \ldots, o_n$ and $o_i' \in \mathcal{O}_i$, $$\sum_{d_i \in \mathcal{D}_i} p(d_1, \ldots, d_i, \ldots, d_n | o_1, \ldots, o_i, \ldots, o_n) =$$

$$\sum_{d_i \in \mathcal{D}_i} p(d_1, \ldots, d_i, \ldots, d_n | o_1, \ldots, o_i', \ldots, o_n)$$

The utility of such a behavior for the CDNP may be given by:

$$\sum_{o \in \mathcal{O}} p_\mathcal{O}(o) \sum_{d \in \mathcal{D}} p(d|o) \mathcal{U}_{o,d}$$

The mathematical objects defined above (i.e., the utility, the set of behaviors, and the set of observations) may be identified with the different characteristics of CDNP. The numbers $1, \ldots, n$ represent the multiple parties, $\mathcal{O}_i$ is the set of possible observations of the $i^{th}$ party, and $\mathcal{D}_i$ is the set of possible decisions made by the $i^{th}$ party. $p_\mathcal{O}(o)$ is the probability distribution over all possible observations that the parties can make.

Figure 2:
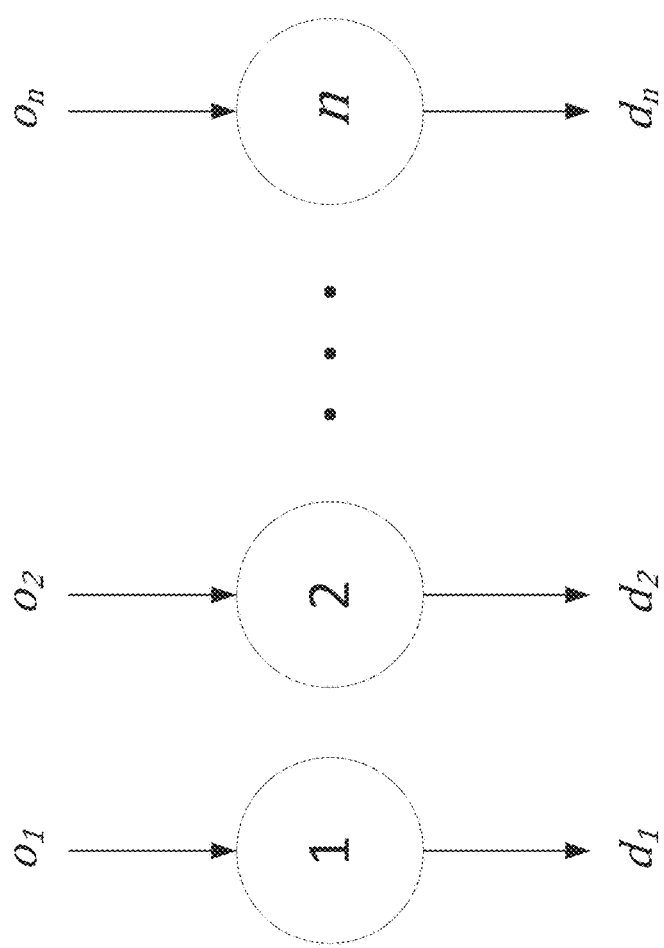
FIG. 2 illustrates a mathematical formulation of a CDNP, consistent with some embodiments of the present disclosure.

A behavior $\{p(d|o)\}_{d \in \mathcal{D}, o \in \mathcal{O}}$ may capture how each party makes its respective decision. For example, the parties make a joint decision d given a joint observation o with probability of $p(d|o)$. FIG. 2 is a visualization of the n parties making n observations and then making n decisions, consistent with disclosed embodiments. FIG. 2 depicts part of a possible mathematical formulation of a CDNP in which multiple parties, 1 through 17, are illustrated making their respective observations, $o_1$ through $o_n$, and decisions, $d_1$ through $d_n$.

It may be clear to one of ordinary skill in the art that Equation 1 captures the restrictions that the parties are not in communication with each other and that the individual observations are only available to the party making the observation. Thus, the marginal probability distribution for the decisions of a subset of the parties does not depend on the observations of the other parties. That is, information about an observation cannot be transmitted to any other party. In some embodiments, not all behaviors can be physically realized.

In some embodiments, $\mathcal{U}$ may represent a matrix that quantifies the joint objective that the n parties are trying to achieve. In some embodiments, the parties are trying to maximize a utility and that $\mathcal{U}_{o,d}$ gives the utility for a joint decision $d \in \mathcal{D}$ given a joint observation $o \in \mathcal{O}$. The utility of a behavior is then the average utility the parties achieve if each party follows that behavior $\{p(d|o)\}_{d \in \mathcal{D}, o \in \mathcal{O}}$.

FIG. 3 shows a general utility matrix with a distribution over possible observations. The mathematical formulation of a CDNP shown in FIG. 3 has a probability distribution over a set of observations and a utility matrix. The set of joint observations $\mathcal{O}$ and the set of joint decisions $\mathcal{D}$ index the elements of the utility matrix $\mathcal{U}$. In FIG. 3, $p_\mathcal{O}(o)$ is the probability distribution over all possible observations that the parties can make, $\mathcal{O}$.

In some embodiments, the above formulation captures binary objectives with success or failure as possible outcomes by setting the utility to 1 for a successful decision and setting the utility to 0 for a failed decision. Thus, the utility of a behavior is the probability of a success decision if the parties follow that behavior.

One of ordinary skill in the art would recognize that, without quantum resources, only local behaviors can be realized. As mentioned above, parties can coordinate decisions, for example, by sharing a set of random numbers or data before making a decision and then making their respective decisions based on their respective observations as well as their copies of the set of random numbers.

In some embodiments, a behavior $\{p(d|o)\}_{d \in \mathcal{D}, o \in \mathcal{O}}$ that can be realized this way, i.e., through the sharing of randomness between coordinating parties, is called local and may be of the form:

$$p(d \mid o) = \int_\mathcal{R} dr p_R(r) \prod_{i=1}^{n} p(d_i \mid o_i, r)$$

where the shared randomness between the decision-making parties is denoted by the random variable R with alphabet $\mathcal{R}$, which can be continuous. In some embodiments, if the value of R is $r \in \mathcal{R}$, the $i^{th}$ party, given observation $o_i \in \mathcal{O}_i$, makes decision $d_i \in \mathcal{D}_i$ with probability $p(d_i|o_i,r)$.

However, by a convexity argument, known to one of ordinary skill in the art, for any CDNP the utility of a local behavior may be maximized by a deterministic behavior where each party makes a deterministic decision based only on its own observation. Mathematically, this deterministic behavior is given by:

$$p(d \mid o) = \sum_{i=1}^{n} \delta_{d_i, f_i(o_i)}$$

where $f_i$ is a function $\mathcal{O}_i \to \mathcal{D}_i$. Hence, if restricted to local behaviors, the CDNP may be solved by giving up on coordinating and letting each party make an independent decision. However, a quantum behavior uses quantum entanglement between the multiple parties to coordinate decisions. The decisions may be determined by the results of quantum measurements conducted by the individual parties, the choices of the type of measurement in turn are determined by their observations.

Figure 4:
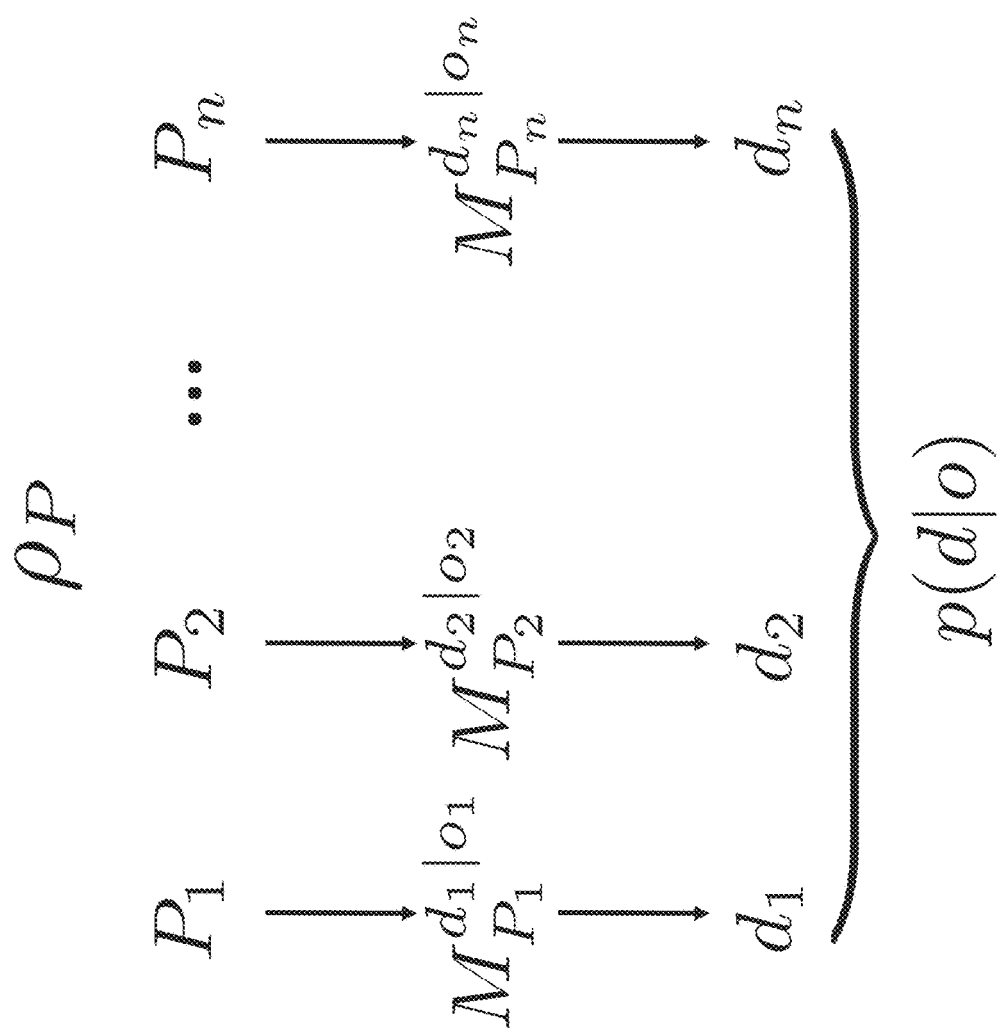
FIG. 4 illustrates an exemplary system of non-communicating parties, consistent with some embodiments of the present disclosure.

FIG. 4 illustrates an exemplary quantum behavior. For example, in some embodiments, a quantum behavior is given by:

$$p(d \mid o) = tr\left[\rho_P \bigotimes_{i=1}^{n} M_{P_i}^{(d_i|o_i)}\right]$$

where $P_i$ is the quantum system held by the $i^{th}$ party, P is the combined quantum system, $\rho_P$ is the shared quantum state, and $$\{M_{P_i}^{(d_i|o_i)}\}_{d_i \in \mathcal{D}_i}$$

is the positive operator valued measure (POVM) measurement used by the $i^{th}$ party given observation $o_i \in \mathcal{O}_i$. The quantum state $\rho_P$ and measurements $$\{M_{P_i}^{(d_i|o_i)}\}_{d_i \in \mathcal{D}_i}$$

describe a protocol realizing this behavior.

One of ordinary skill in the art would recognize that quantum behaviors can obtain higher utilities than any local behaviors for certain CDNPs and that this phenomenon is a Bell inequality violation, often cited as the definitive dividing line between quantum and classical physics, which can only realize local behaviors. Bell inequalities are used in many mathematical proofs of the superiority of quantum technology in various information processing tasks, and, here, allows the quantum solution for a CDNP to be used to improve decision-making.

Several situations exist in which quantum behaviors may outperform local behaviors. For example, quantum behaviors may outperform local behaviors in Bell inequalities such as the Clauser-Horne-Shimony-Holt inequality. Furthermore, the set of local behaviors forms a polytope in a real vector space when the number of parties, number of possible observations for each party, and number of decisions for each party are fixed. Each facet of the polytope may correspond to a utility matrix of a CDNP with the fixed numbers of parties, observations, and decisions. In the two-party case, empirical evidence shows that for every facet that does not arise from a trivial positivity condition on the probabilities, there is a quantum advantage for the corresponding CDNP. This is stated in "Bell nonlocality," N. Brunner et al., Reviews of Modern Physics, Apr. 18, 2014, which is hereby incorporated by reference herein in its entirety.

When all the observation and decision sets are of size two, for example, for random instances of a class of CDNP's corresponding to symmetric XOR games, quantum behaviors may be advantageous in the limit of many players. This can be found for instance in "Random Constructions in Bell Inequalities: A Survey," C. Palazuelos, Foundations of Physics, August 2018, which is hereby incorporated by reference herein in its entirety. In this example, numerical experiments suggest that in the case with only two parties, there is already a quantum advantage around 25% of the time, as shown in "Random Games for Two Players with Binary Questions and Answers," D. Ding, Unpublished, October 2018, which is hereby incorporated by reference herein in its entirety.

As an example of finding a quantum protocol for a CDNP, assume a set of observations, $\{\mathcal{O}_i\}_{n=1}$, a set of decisions, $\{\mathcal{D}_i\}_{i=1}^{n}$, a probability distribution over all possible observations that the parties can make, $p_\mathcal{O}$ (o), and a utility matrix, $\mathcal{U}$. To determine the quantum protocol for this CDNP, the system may maximize the utility of the realized behavior as shown below in Equation 2:

$$\sum_{o \in \mathcal{O}} p_O(o) \sum_{d \in \mathcal{D}} \left[\rho_P \bigotimes_{i=1}^{n} M_{P_i}^{(d_i|o_i)}\right] \mathcal{U}_{o,d}$$

over all possible quantum states $\rho_P$ and POVM measurements $$M_{P_i}^{(d_i|o_i)}.$$

In some embodiments, for the sake of numerical analysis, the quantum systems may be of any finite dimension.

In some embodiments, the quantum states and measurements may be represented as matrices. Then, by fixing the dimensions of the quantum systems, Equation 2 may become a semidefinite program (SDP), which may be solved using standard techniques. In some embodiments, the CDNP problem may be simplified by considering pure quantum states and projection measurements. Furthermore, instead of optimizing over quantum states, it may be simpler to directly compute the largest eigenvalue of the linear operator as shown in Equation 3:

$$\sum_{o \in O} p_O(o) \sum_{d \in \mathcal{D}} \left( \bigotimes_{i=1}^{n} M_{P_i}^{(d_i|o_i)} \right) \mathcal{U}_{o,d}$$

Common techniques for linear algebra optimization, known to one of ordinary skill in the art, may be applicable, such as choosing a convenient basis to reduce the number of free parameters. Other theoretical results may allow for a smaller search space, for instance by providing upper bounds on the dimensions of quantum systems necessary to achieve the optimal utility.

In some embodiments, Equation 2 may be optimized over quantum states and measurements that can be implemented by quantum circuits in the laboratory. For example, the system may simulate these quantum circuits on a classical computer using, for example, tensor network contraction techniques. In some embodiments, an algorithm may choose reasonable heuristics for the quantum state and measurements in the form of parametrized circuits. The corresponding behavior and its utility may be computed via a tensor network contraction. Some optimization procedure may be performed to maximize the utility.

In other embodiments, parameterized quantum circuits may implement the quantum states and measurements. The measurement outcomes may be provided to a classical computer, which updates the parameters accordingly. This may be referred to as a hybrid quantum/classical variational optimization algorithm.

Referring again to FIG. 1, at step 108 the system may physically implement a protocol for the desired quantum behavior.

Figure 5:
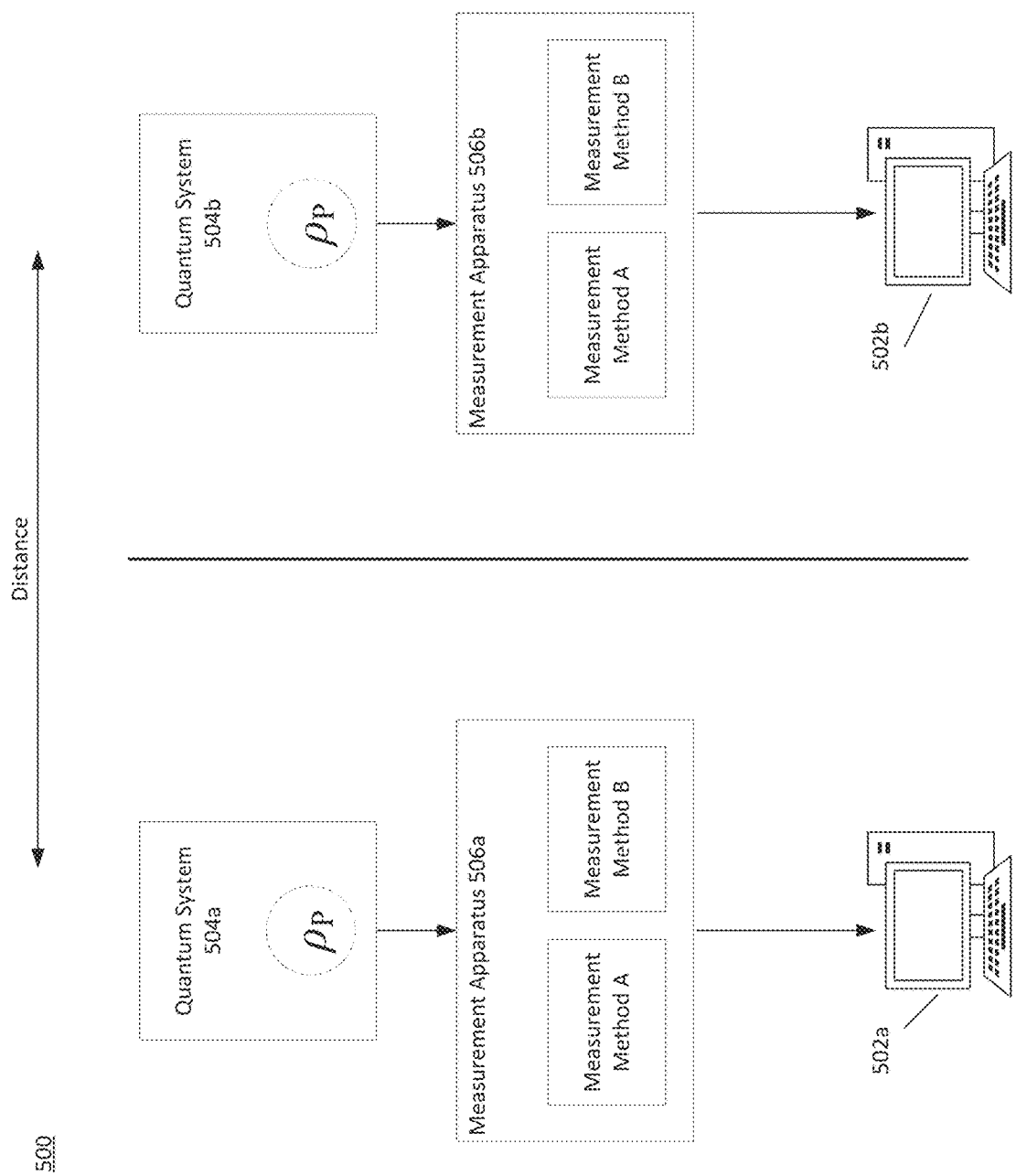
FIG. 5 illustrates an exemplary system for CDNP, consistent with some embodiments of the present disclosure can be implemented.

FIG. 5 illustrates an exemplary physical system 500, consistent with disclosed embodiments. System 500 may include two parties, e.g., parties 502a and 502b, separated by a distance. In other embodiments, system 500 may include any number of parties. Parties 502a and 502b may not be in communication but may desire to each reach a respective decision based on observations made by the other party. Each party may be associated with a quantum system 504a and 504b, respectively. As described above, to reach a decision, each party 502a and 502b may receive, from a measurement device 506a and 506b, respectively, the outcome of a measurement performed on the quantum systems 504a and 504b, whose joint quantum state is described by $\rho_P$.

Each party may not have access to or may not receive the other party's respective observations. In some embodiments, an observation may be data received by a party, e.g., party 502a or 502b, via a network. The data may be received, for example, from a data storage system, computer system, third-party computer system, and the like. In some embodiments, an observation may be input data received from a user of a computer system associated with a party. In other embodiments, an observation may include sensor data. The above examples of observations are not meant to be limiting.

Measurement devices 506a and 506b may be capable of performing a number of different measurements, e.g., measurement method A and measurement method B, on quantum systems 504a and 504b, respectively. Measurement method A and measurement method B may be different types of measurements, for example, measurement method A may measure the polarization of quantum system 504a, while measurement method B may measure the spin state of quantum system 504a. Other types and methods of measurement may be used. The measurement performed by each device may be based on, for example, one or more observations made by parties 502a and 502b, respectively. Thus, an observation made by party 502a may determine whether party 502a measures the quantum system 504a using measurement method A or measurement method B and a separate observation made by party 502b, and unknown to party 502a, may determine whether party 502b measures the quantum system 504b using measurement method A or measurement method B. Therefore, although parties 502a and 502b are not in communication, decisions by each respective party may be coordinated via measurements made on the entangled quantum systems 504a and 504b, respectively.

Figure 6:
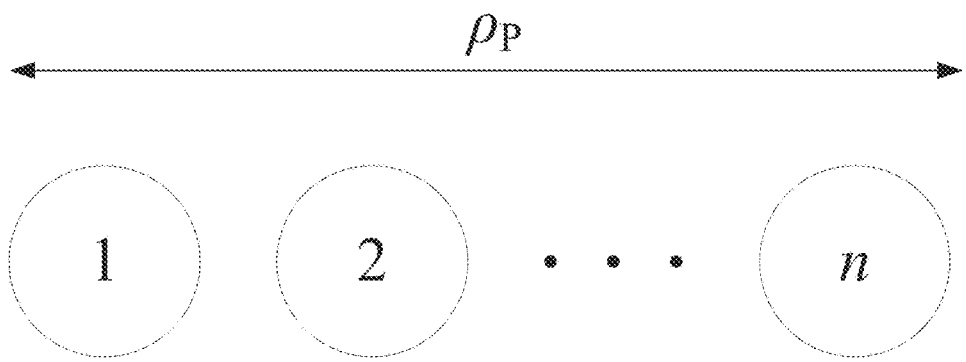
FIG. 6 illustrates an exemplary static source implementation, consistent with some embodiments of the present disclosure can be implemented
Figure 7:
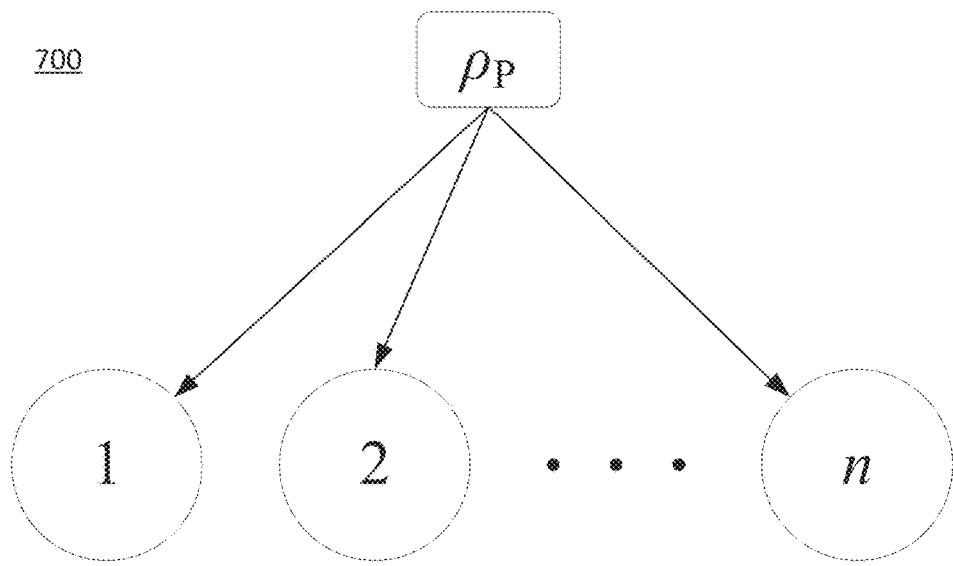
FIG. 7 illustrates an exemplary dynamic source implementation, consistent with some embodiments of the present disclosure can be implemented

In some embodiments, as shown in FIGS. 6 and 7, respectively, the system 500 may be physically implemented in one of two general classes of physical implementations, referred to herein as static source and dynamic source. These sources may be particle sources configured to generate a particle having a quantum state. The choice of physical implementation may depend on the specific scenario at hand, e.g., how the entangled state is shared between the decision-making parties.

In a static source implementation 600, shown in FIG. 6, the entangled quantum state, $\rho_P$, may be stored in quantum systems possessed by the various parties, e.g., quantum systems 504a and 504b. FIG. 6 shows an exemplary setup for a static entanglement source implementation of a protocol realizing a quantum behavior in which $\rho_P$ is the entangled quantum state stored in quantum systems held by the parties 1, 2, . . . , n.

A static source 600 may be used in scenarios in which communication between parties is insufficiently fast. For example, if the parties are not far from each other (e.g., about one mile), there are protocols that can realize a quantum behavior which can still be conducted in a time shorter than a time it would take for light to travel between the parties. For some applications, a static source may be more convenient than a dynamic source because it does not require a continuous supply of entangled quantum systems. Furthermore, the detectors used to measure the static sources are of high efficiency such that the protocol may be implemented reliably. Possible platforms to store a coherent quantum state for an extended period of time may include, for example, trapped ions, nitrogen-vacancy centers, nuclear spins, and microwave cavities. In some embodiments, topological systems such as semiconductor nanowires may also be possible.

In a dynamic source implementation 700, shown in FIG. 7, copies of the entangled quantum state, $\rho_P$, may be continuously provided to the decision-making parties. FIG. 7 shows the setup for a dynamic entanglement source implementation of a protocol realizing a quantum behavior. In this example, $\rho_P$ is the entangled quantum state, copies of which are continuously supplied to the parties 1, 2, . . . , n.

A dynamic source 700 may be used, for example, when parties are globally distributed parties and do not have time to or are unable to communicate. In this embodiment, the parties are not required to store the entanglement, which can be difficult and costly. Possible platforms for reliably sending the quantum state to the respective parties may include, for example, photonic systems including infrared photons across free space or fiber optic cables. In some embodiments, for CDNPs that arise from scenarios where the parties are separated by large distances, free space platforms such as a satellite equipped with quantum optical transceivers may be used as a dynamic source. Longer distances over fiber may be possible using entanglement transmission techniques such as entanglement swapping or a quantum repeater.

In some embodiments, a universal protocol for quantum behaviors may be used in the exemplary two-party case. If the source provides embezzling entangled states of high dimensions, the quantum state provided by the entanglement source can be used for a number of CDNPs, such that the source does not need to be changed for different CDNPs. For example, for any protocol that realizes a quantum behavior with a certain utility, there is another protocol using embezzling entangled states. The family may be parametrized by the dimension of the state, and the universality result may state that the utility can be arbitrarily close for a sufficiently high dimensional state. Hence, it may be sufficient for the source to emit embezzling entangled states.

In embodiments in which the embezzling state standardization approach is taken, an estimate for the size of the state required may be determined. It can be shown that an embezzling state that can be used to obtain a state with trace distance d from a quantum state $|\Psi\rangle_{P_1P_2}$ is sufficient to obtain a utility of at least (1−d) times the value achieved by $|\Psi\rangle_{P_1P_2}$, assuming the same measurement operators are used. This formula can be used, for example, when the overall linear operator (i.e., Equation 3) is positive semidefinite, which in general can be made true by making every entry in the utility matrix non-negative.

An embezzling entangled state of $$\left\lceil \frac{1}{1-\sqrt{1-d^2}} \times N(\Psi) \right\rceil$$

pairs of qubits, where N(Ψ) is the number of pairs of qubits of the state $|\Psi\rangle_{P_1P_2}$, is sufficient to achieve this trace distance.

Figure 8:
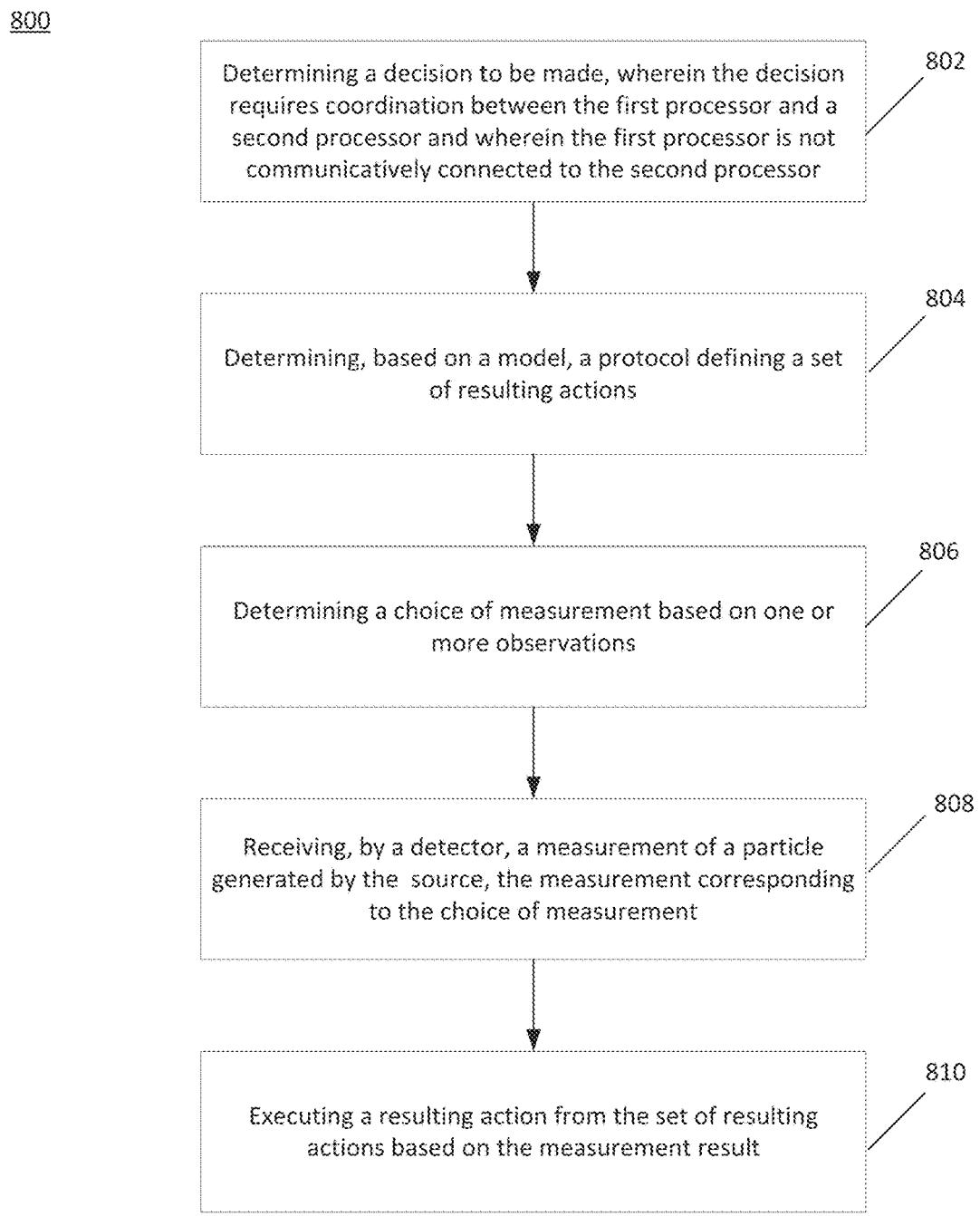
FIG. 8 illustrates a flowchart of an exemplary process for CDNP, consistent with some embodiments of the present disclosure can be implemented.

FIG. 8 is an exemplary flowchart for a process 800 of identifying and solving a CDNP problem, consistent with disclosed embodiments.

At step 802, a system, e.g., system 500, determines a decision to be made requiring coordination between two or more parties that are not communicatively connected to each other. As previously described, the two or more parties may be communicatively connected, but desire reduced latency and increased efficiency over traditional methods of communication. In this step, the system identifies the problem as a CDNP problem in which the two or more parties make respective decisions based on observations made by each party, but where the parties cannot communicate these observations to each other.

At step 804, the system may determine, based on a model, a quantum protocol defining a set of resulting actions. This protocol may realize a behavior p(d|o). In some embodiments, the system may generate the model, which may include, as previously described, a set of observations and a set of decisions.

At step 806, the system may determine a choice of measurement based on local observations. For example, the choice of measurement may correspond to a type or method of measurement to be made as determined by the protocol for the system.

At step 808 the system may receive, by a detector, a measurement of a particle generated by the source. The detector may be a quantum sensor, for example, an avalanche photodiode, atomic interferometer, or the like.

At step 810, the system may execute a resulting action from the set of resulting actions based on the measurement of the particle. For example, the action may provide the maximum utility based on the set of possible observations and decisions, as described above.

The following non-limiting example is only one possible example and is for demonstrative purposes. One of ordinary skill in the art would recognize other possible implementations and uses of the systems and methods described herein.

In this example, a high frequency trading firm has two computer clusters (e.g., parties 502*a* and 502*b*), one trading in the Stock Exchange of Hong Kong (SEHK) and the other in the New York Stock Exchange (NYSE), respectively. The clusters may be based near the respective exchanges in order to engage in low latency trading at millisecond or sub-millisecond time scales.

Now, two of the many securities that the clusters trade are the stocks of two related multinational companies, one based in Hong Kong and the other in New York. The two clusters may monitor price changes of the respective stocks and buys or sells stocks accordingly.

This scenario is a CDNP because there are two clusters that do not have time to communicate, each cluster can only monitor its own local stock price changes, and the trading firm would like to maximize profits. Thus, the clusters must coordinate between each other.

To formulate a CDNP mathematically for this example, suppose the clusters observe only whether their respective stock price increases or decreases and decide only between buying or selling some fixed number of stock. Considering one particular pair of transactions for the two clusters, this scenario becomes a two-party CDNP. The set of observations for each party is {bull, bear} and the set of decisions for each party is {buy, sell}. Given previous stock price movements and market information, there is a prior $p_O$ for the price change of the two stocks given by $$p_O(o) = \begin{cases} 0.176 & \text{bull, bull} \\ 0.194 & \text{bull, bear} \\ 0.472 & \text{bear, bull} \\ 0.158 & \text{bear, bear} \end{cases}$$

In this example, the utility matrix is given by $$\mathcal{U} = \begin{array}{c} \\ \text{bull, bull} \\ \text{bull, bear} \\ \text{bear, bull} \\ \text{bear, bear} \end{array} \begin{array}{c} \text{buy, buy} \quad \text{buy, sell} \quad \text{sell, buy} \quad \text{sell, sell} \\ \left[ \begin{array}{cccc} 2.05 & 0.697 & 1.71 & 2.47 \\ 0.811 & 0.313 & 2.02 & -1.08 \\ 0.185 & -0.142 & -0.495 & 0.305 \\ 0.678 & -0.220 & -0.954 & 3.38 \end{array} \right] \end{array}$$

whose entries are interpreted as net profits in some monetary unit. The above distribution and utility matrix define the CDNP. Note that these distribution and utility matrix are chosen for demonstrative purposes and do not represent a realistic financial situation. The following analysis can be done for a CDNP with an arbitrary utility matrix, including realistic ones.

Next, the system may determine the protocol and quantum behavior for this CDNP. The linear algebraic optimization approach can be taken, where, for example, a Python script can be written to maximize the quantity in Equation 2. Due to the simplicity of the CDNP, using various techniques and theoretical results the problem presented in this example can be reduced to an optimization over just two angular parameters.

Figure 9:
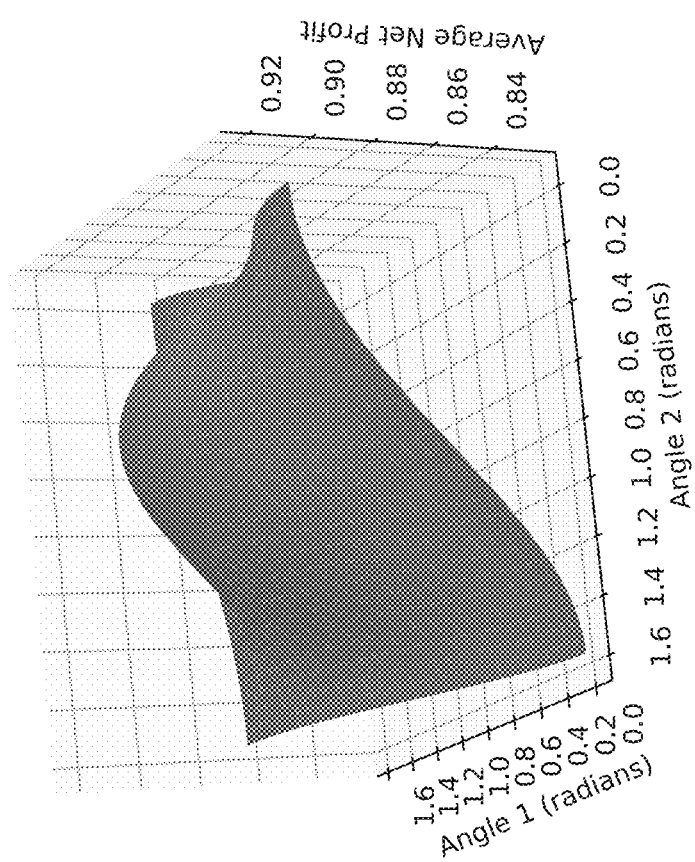
FIG. 9 illustrates a plot of the average net profit as a function of two angular parameters in an exemplary CDNP scenario, consistent with some embodiments of the present disclosure can be implemented.

FIG. 9 is a plot of the average net profit as a function of two angular parameters in this exemplary CDNP problem. It is known to one of ordinary skill in the art that for the case when there are two parties and the observation and decision sets are of size two, the maximum utility can be attained by spin measurements $|\varphi(\theta)\rangle\langle\varphi(\theta)|$ on a pair of spin-½ particles (e.g., qubits, two dimensional quantum systems). Thus, as shown in FIG. 9, the largest eigenvalue of the linear operator may be optimized with respect to the angles $\theta$ of the spin measurements. In this example, the two angles parameterize the measurements made by the two clusters, e.g., projection measurements $|\varphi(\theta)\rangle\langle\varphi(\theta)|$ where $|\varphi(\theta)\rangle = \cos(\theta)|buy\rangle + \sin(\theta)|sell\rangle$ where the qubits' Hilbert spaces are denoted by the span of the two states $|buy\rangle$, $|sell\rangle$. The two angles are in units of radians and are ordered in the same manner as the two clusters.

The behavior may be achieved using a protocol having the two-qubit quantum state:

$$|\Psi\rangle_{P_1P_2} = 0.491|buy,buy\rangle_{P_1P_2} - 0.356|buy,sell\rangle_{P_1P_2} + 0.337|sell,buy\rangle_{P_1P_2} + 0.720|sell,sell\rangle_{P_1P_2}$$

and measurement operators $$M_{P_1}^{(buy|bull)} = |\varphi(0)\rangle\langle\varphi(0)|_{P_1}, M_{P_1}^{(buy|bear)} = |\varphi(0.879)\rangle\langle\varphi(0.879)|_{P_1},$$

$$M_{P_2}^{(buy|bull)} = |\varphi(0)\rangle\langle\varphi(0)|_{P_2}, M_{P_2}^{(buy|bear)} = |\varphi(0.635)\rangle\langle\varphi(0.635)|_{P_2},$$

Note that in this example, the other measurement operators are implied by completeness. Furthermore, the angles are in radians, and throughout only three significant figures are retained. Note that the angles are 0 for both parties in the case of a "bull" observation because the quantum state was rotated so that both of these angles are 0.

The resultant quantum behavior is given by:

$$p(d|o) = \begin{array}{c} \text{buy, buy} \quad \text{buy, sell} \quad \text{sell, buy} \quad \text{sell, sell} \\ \begin{array}{c} \text{bull, bull} \\ \text{bull, bear} \\ \text{bear, bull} \\ \text{bear, bear} \end{array} \begin{bmatrix} 0.241 & 0.126 & 0.113 & 0.519 \\ 0.0342 & 0.334 & 0.487 & 0.145 \\ 0.328 & 0.108 & 0.0268 & 0.538 \\ 0.430 & 0.00566 & 0.0918 & 0.473 \end{bmatrix} \end{array}$$

where a matrix representation is chosen here to visually compare with the utility matrix.

In this example, the quantum behavior attempts to maximize the utility by assigning high probabilities to decisions that give high utilities and, inversely, low probabilities to decisions with low utilities. Applying the calculation described with reference to Equation 1, the utility for this behavior is 0.926. That is, with this quantum protocol the firm obtains an average net profit of 0.926.

For comparison, the local behavior for this CDNP problem can be calculated, for example, by brute force or by solving a linear program. This yields a deterministic behavior in which the two clusters are always selling stocks.

$$p(d|o) = \begin{array}{c} \text{buy, buy} \quad \text{buy, sell} \quad \text{sell, buy} \quad \text{sell, sell} \\ \begin{array}{c} \text{bull, bull} \\ \text{bull, bear} \\ \text{bear, bull} \\ \text{bear, bear} \end{array} \begin{bmatrix} 0 & 0 & 0 & 1 \\ 0 & 0 & 0 & 1 \\ 0 & 0 & 0 & 1 \\ 0 & 0 & 0 & 1 \end{bmatrix} \end{array}$$

The local behavior achieves a net profit of 0.904. Hence, the quantum behavior does yield a greater net profit by 2.49%. Again, these numbers are purely for demonstrative purposes and no statement is made regarding how large of a quantum advantage is significant. In general, the advantage may depend on the utility matrix of the CDNP, with some matrices yielding no quantum advantage and others yielding arbitrarily large advantages. For example, there exist sequences, indexed by the size of the observation sets, of CDNP's with utility matrices for which the ratio of the utilities of the quantum behavior and the local behavior diverge with the sizes of the observation sets.

In this example, the system may be implemented with a quantum-enabled satellite platform—a dynamic source implementation, as discussed with reference to FIG. 7. The satellite may continuously transmit polarization-entangled photons to the two clusters in New York and Hong Kong. The clusters may be equipped with the ability to perform quantum measurements on their respective received photons. For instance, where $|\varphi(\theta)\rangle = \cos(\theta)|buy\rangle + \sin(\theta)|sell\rangle$, assuming "buy" and "sell" correspond to vertical and horizontal polarization states, respectively, the two clusters may use Pockels cells and polarizing beam splitters to realize the measurement operator $|\varphi(\theta)\rangle\langle\varphi(\theta)|$, where $\theta$ is the angle of polarization with respect to the vertical axis.

It is appreciated that some of the embodiments herein include database systems, methods, and tangible non-transitory computer-readable media. It is appreciated that at least of the method shown in FIG. 8 may be implemented using software involving instructions being executed, for example, by clusters affiliated with parties (e.g., parties 502a and 502b) that receives instructions from a tangible non-transitory computer-readable storage medium.

Systems consistent with the present disclosure may involve a cluster of computing resources, each including at least one processor and memory, and the memory may be a tangible non-transitory computer-readable storage medium. As used herein, a tangible non-transitory computer-readable storage medium refers to any type of physical memory on which information or data readable by at least one processor may be stored. Examples include random access memory (RAM), read-only memory (ROM), volatile memory, non-volatile memory, hard drives, CD ROMs, DVDs, flash drives, disks, registers, caches, and any other known physical storage medium. Singular terms, such as "memory" and "computer-readable storage medium," may additionally refer to multiple structures, such a plurality of memories or computer-readable storage media. As referred to herein, a "memory" may comprise any type of computer-readable storage medium unless otherwise specified. A computer-readable storage medium may store instructions for execution by at least one processor, including instructions for causing the processor to perform steps or stages consistent with embodiments herein. Additionally, one or more computer-readable storage media may be utilized in implementing a computer-implemented method. The term "computer-readable storage medium" should be understood to include tangible items and exclude carrier waves and transient signals.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A system for coordinating decisions, the system comprising:
a first subsystem comprising a first processor and a first memory communicatively coupled to the first processor, wherein the memory stores instructions that when executed by the first processor cause the first subsystem to perform operations comprising:
selecting a first measurement based on a first observation in a set of observations, the first measurement realizing a first set of measurement operators;
performing the first measurement on a first quantum system produced by a first quantum state source using a first detector to obtain a first measurement outcome;
executing a first action from a set of actions based on the first measurement outcome according to a quantum protocol, the quantum protocol specifying a joint quantum state shared across the first subsystem and a second subsystem, sets of measurement operators including the first set of measurement operators, the selection among the sets of measurement operators based on the set of observations, and a mapping of measurement outcomes to the set of actions, the quantum protocol based on expected utilities of the first action and a second action given the first observation and a second observation; and
wherein the first quantum state source comprises a static source or a dynamic source; and
the second subsystem comprising a second processor and a second memory communicatively coupled to the second processor, wherein the second memory stores instructions that when executed by second processor cause the second subsystem to perform operations comprising:
selecting a second measurement based on a second observation in the set of observations, the second measurement realizing a second measurement operator of the set of measurement operators;
performing the second measurement on a second quantum system produced by a second quantum state source using a second detector to obtain a second measurement outcome;
executing a second action from the set of actions based on the second measurement outcome according to the quantum protocol;
wherein the second quantum state source comprises a static source when the first quantum state source comprises a static source, and the second quantum state source comprises the first quantum state source when the first quantum state source comprises a dynamic source; and
wherein the second quantum system is entangled with the first quantum system.

2. The system of claim 1, wherein the first quantum source comprises a static source.

3. The system of claim 2, wherein the static source comprises at least one of trapped ions, nitrogen-vacancy centers, nuclear spins, quantum circuits, and microwave cavities.

4. The system of claim 1, wherein the first quantum source comprises a dynamic source.

5. The system of claim 4, wherein:
the operations further comprise continuously receiving, from the dynamic source, the first quantum system.

6. The system of claim 1, wherein:
the quantum protocol is configured using: a utility function that accepts a set of first and second observations and a set of first and second actions as inputs, and a distribution of probabilities over the set of first and second observations, the distribution of probabilities based on a set of historical data.

7. The system of claim 6, wherein the utility function comprises a utility associated with each combination of first and second observations and first and second actions of the set of observations and the set of actions, respectively.

8. The system of claim 1, wherein the specified set of quantum states comprises embezzling entangled states and the quantum protocol approximates another quantum protocol configured for use with differing quantum states having a lower dimension than the specified quantum states.

9. A computer-implemented method for coordinating decisions, the method comprising:
at a first system:
selecting a first measurement based on a first observation in a set of observations, the first measurement realizing a first measurement operator of a set of measurement operators;
performing the first measurement on a first quantum state produced by a first quantum state source using a first detector to obtain a first measurement outcome;
executing a first action from a set of actions based on the first measurement outcome according to a quantum protocol, the quantum protocol specifying a joint quantum state shared across the first system and a second system remote from the first system, the set of measurement operators, the selection among the set of measurement operators based on the set of observations, and a mapping of measurement outcomes to the set of actions, quantum protocol based on expected utilities of the first action and a second action given the first observation and a second observation; and
wherein the first quantum state source comprises a static source or a dynamic source; and
at the second system:
selecting a second measurement based on a second observation in the set of observations, the second measurement realizing a second measurement operator of the set of measurement operators;
performing the second measurement on a second quantum state produced by a second quantum state source using a second detector to obtain a second measurement outcome;

executing a second action from the set of actions based on the second measurement outcome according to the quantum protocol;

wherein the second quantum state source comprises a static source when the first quantum state source comprises a static source, and the second quantum state source comprises the first quantum state source when the first quantum state source comprises a dynamic source; and wherein the second quantum state is entangled with the first quantum state.

10. The method of claim 9, wherein the first quantum source comprises a static source.

11. The method of claim 10, wherein the static source comprises at least one of trapped ions, nitrogen-vacancy centers, nuclear spins, quantum circuits, and microwave cavities.

12. The method of claim 9, wherein the first quantum source comprises a dynamic source.

13. The method of claim 12, further comprising:

continuously receiving, from the dynamic source, the first quantum state.

14. The method of claim 9, wherein:

the quantum protocol is configured using: a utility function that accepts a set of first and second observations and a set of first and second actions as inputs, and a distribution of probabilities over the set of first and second observations, the distribution of probabilities based on a set of historical data.

15. The method of claim 14, wherein the utility function comprises a utility associated with each combination of first and second observations and first and second actions of the set of observations and the set of actions, respectively.

16. The method of claim 9, wherein the specified set of quantum states comprises embezzling entangled states and the quantum protocol approximates another quantum protocol configured for use with differing quantum states having a lower dimension than the specified quantum states.

17. The system of claim 1, wherein the sets of measurement operators includes differing sets of measurement operators associated with the first and second subsystems.

18. The system of claim 1, wherein the first and second quantum systems comprise entangled photons and the measurements comprise photon polarization measurements.

19. The system of claim 18, wherein the first and second detectors include Pockels cells.

* * * * *